July 12, 1932.                W. R. J. WOOCK                1,866,832
                           TIRE VULCANIZING MOLD
                           Filed Dec. 8, 1930            3 Sheets-Sheet 2
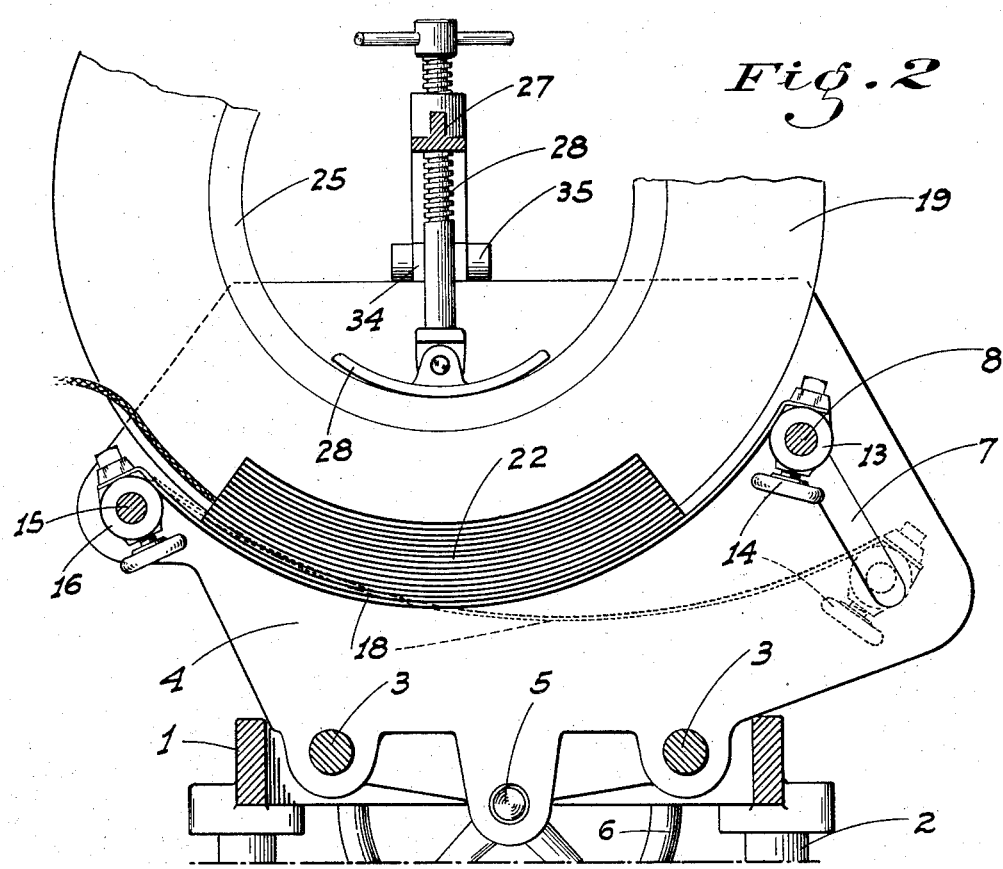
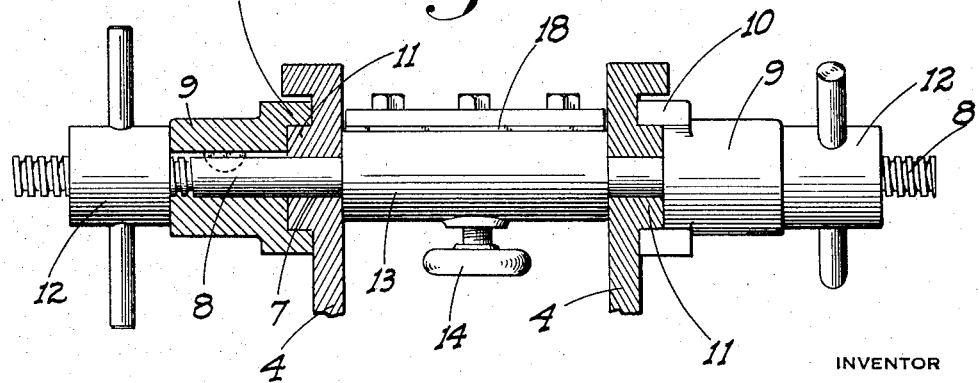
INVENTOR
W. R. J. Woock
BY
ATTORNEY

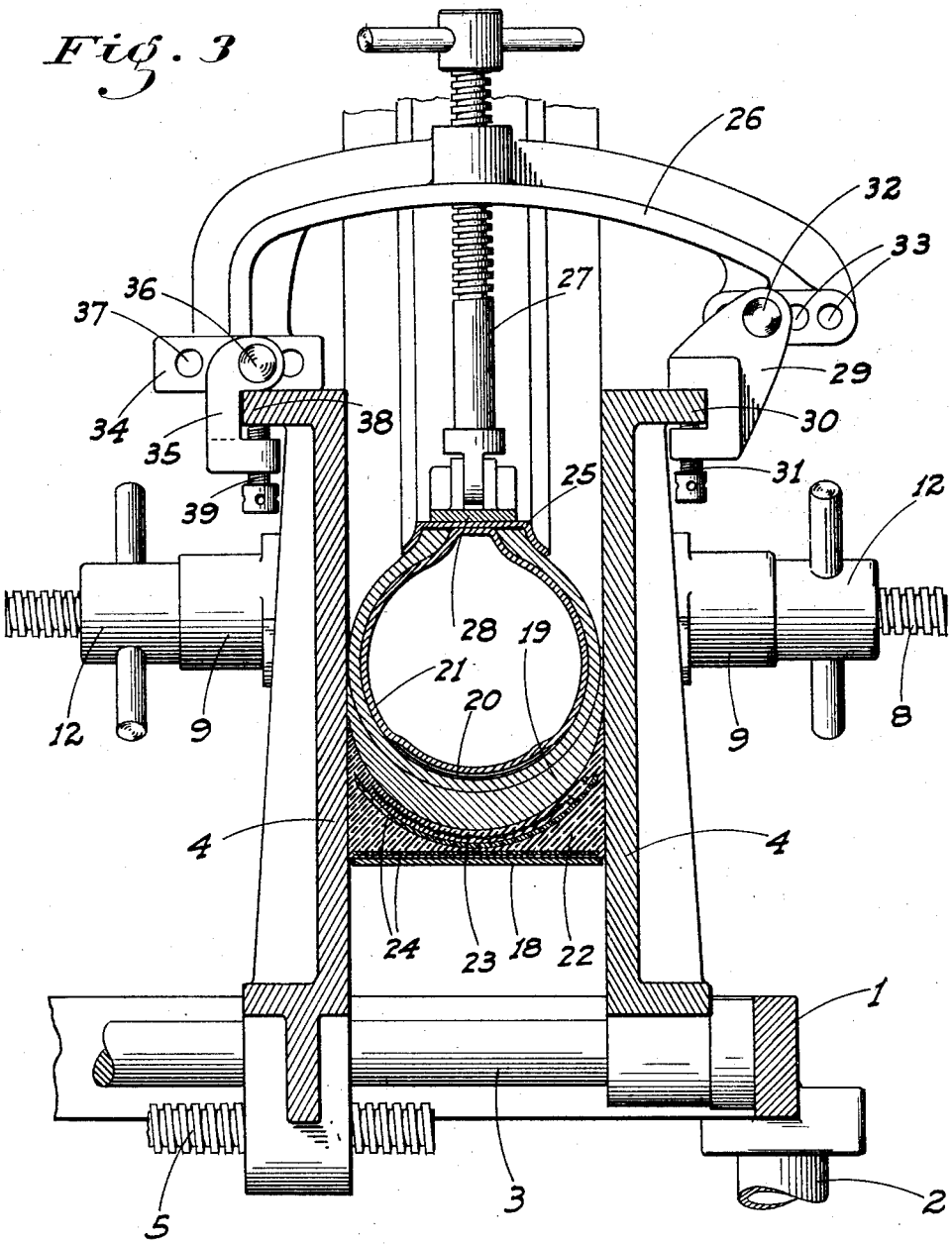

Patented July 12, 1932

1,866,832

UNITED STATES PATENT OFFICE

WALTER R. J. WOOCK, OF LODI, CALIFORNIA, ASSIGNOR TO SUPER MOLD CORPORATION, OF LODI, CALIFORNIA, A CORPORATION OF NEVADA

TIRE VULCANIZING MOLD

Application filed December 8, 1930. Serial No. 500,799.

This invention relates to segmental molds such as are used in vulcanizing patches onto tire casings, when repairing damage done by blow-outs, bad cuts or the like, and which require only a small length of the casing being engaged by the mold to effect the repairs.

As at present constructed such molds have a definite circumferential curvature and they can therefore only be properly used with a tire of a corresponding circumferential size. This means that for a complete installation in a repair shop a considerable number of these molds and a consequently heavy initial expense is necessary. If, on the other hand, the repair shop attempts to operate with only one or a very few of the molds, unsatisfactory work will be turned out owing to the failure of the different sized casings which are very liable to be encountered, properly fitting the molds actually intended for other sizes.

The principal object of my invention is to avoid either the excessive expenditure or the poor work above referred to by providing a mold so constructed that it may be used with equal effectiveness for casings of all standard sizes within a certain range; and which, to use it for different sized casings, requires only an assortment of relatively inexpensive parts, together with one main mold structure, which parts may be easily and quickly placed in position when needed.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is a sectional elevation of the same.

Fig. 3 is an enlarged transverse section on the line 3—3 of Fig. 1.

Fig. 4 is an enlarged fragmentary transverse section on the line 4—4 of Fig. 1.

Figure 1:
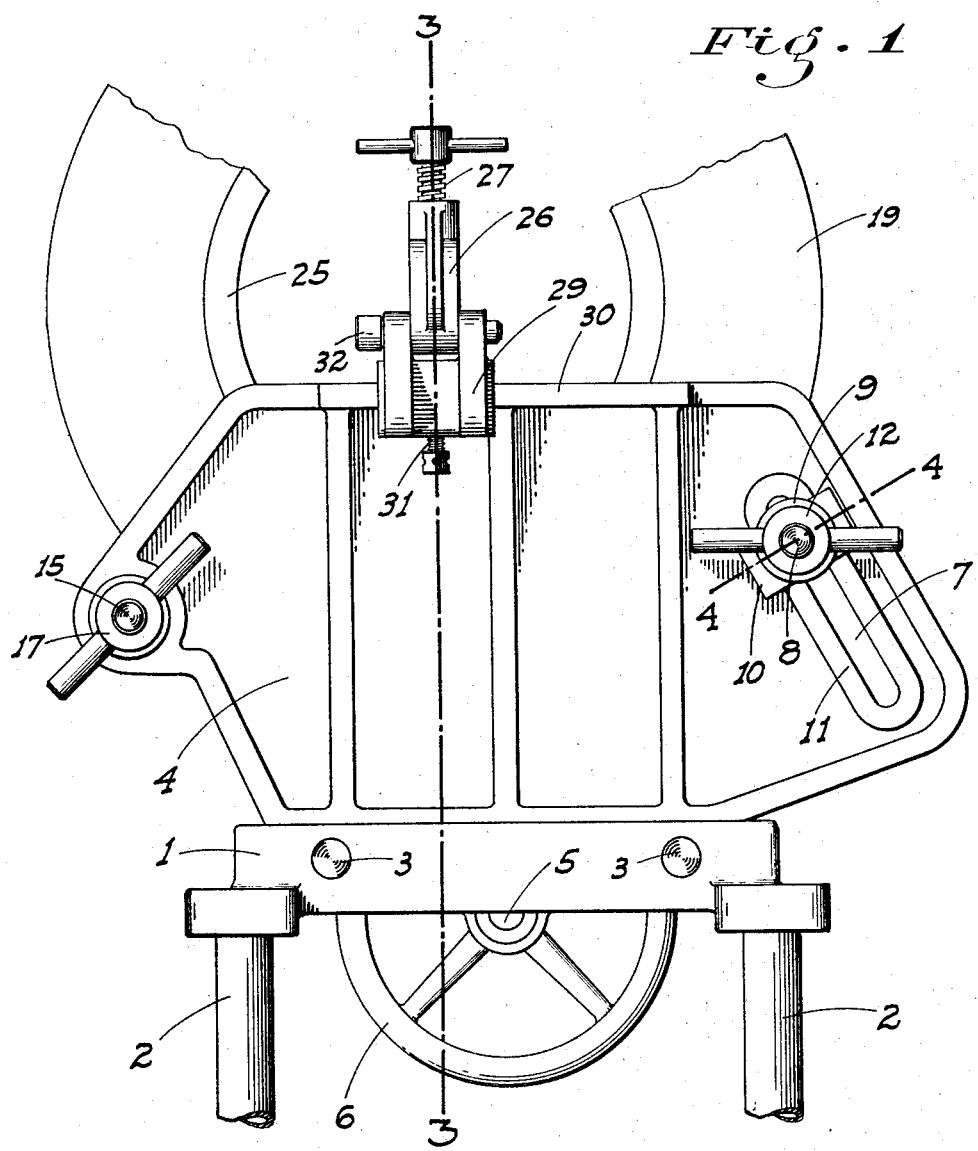
Fig. 1 is a side elevation of my improved mold.

Referring now more particularly to the characters of reference on the drawings, the numeral 1 denotes a substantially rectangular and horizontal frame supported on legs 2. Extending between the opposite sides of the frame are spaced bars 3 on which are mounted the upstanding and rigid side plates 4 of the mold. One of these plates is immovable and is adjacent one side of the frame. The other plate however is slidable along the bars so that the space between the plates may be altered; said slidable plate being controlled in such movement by a screw 5 disposed between the bars.

This screw is journaled against longitudinal movement in the frame and is threaded through said plate, being provided at its outer end with a hand wheel 6.

Slidably projecting through slots 7 in the side plates adjacent one end of the same and intermediate the top and bottom thereof is a shaft or bolt 8 which is threaded on both ends. These slots are disposed at an acute angle to a vertical plane in downwardly diverging relation to the opposite ends of the side plates. Keeper sleeves 9 are slidably keyed onto the bolt outwardly of the side plates, said sleeves having flanges 10 which overhang and engage the side flanges 11 which extend alongside the slots on the outside of the plates. The bolt therefore is prevented from turning without interfering with its relative lateral adjustment or with its movement along the slots. Outwardly of the slots hand clamping nuts 12 engage the threaded portions of the bolt. Between the side plates the bolt carries a removable sleeve 13 which is held against rotation on the bolt by a clamping screw 14 or the like. At the opposite end of the side plates is a similarly threaded anchor bolt 15 having a sleeve 16 thereon between the side plates and clamping nuts 17 outwardly of said plates. This bolt however is mounted in a fixed position, in such relation to the slots that the straight line distance from the bolt 15 to the top of the slots is less than the distance to the bottom of the slots.

A flexible strip 18 of spring steel or the like is secured at its ends to and extends between the sleeves 13 and 16, being practically the same width as the latter. In turn the length of said sleeves determines the extent to which the plates 4 may approach each other and serve as means to limit such approaching movement.

The length of the strip 18 is such that when the bolt 8 is at the bottom of the slots said strip has a longitudinal concave curvature relative to the top of the mold whose radius is approximately 28 inches. When the bolt is shifted to the upper end of the slots the concavity of the strip is correspondingly increased and its radius is then approximately fourteen inches. The two radii above given and all intermediate ones are sufficient to take care of practically all standard sized tires which may be encountered. By reason of the slots being positioned as above stated, it will be seen that if the distance between the ends of the flexible strip is increased, and the radius of curvature of the same is also increased, the depth of the major portion of the strip relative to the top of the mold is likewise increased. This feature insures that the distance between the center of the strip and the top of the mold will always be greater than the cross-sectional diameter of a tire, without having a small tire disposed so deep in the mold that it would be unhandy to perform the necessary operations thereon.

It will therefore be seen that by merely shifting the slidable bolt the strip 18, which forms the bottom or tread engaging element of the mold, is altered in its curvature so as to properly engage the casing 19 of any circumferential diameter intermediate the extremes above given. With any one setting of the side plates 4 all casings of any circumferential diameter and of all cross-sectional diameters approximately equal to a given spacing between the side plates, may be treated. For tires of different cross sectional diameters, regardless of their circumferential diameter, another strip 18 of the proper width must be used, and the necessary number of such strips is provided with each mold. The strip and the connecting sleeves 13 and 16 are permanently connected together and are removable as a unit.

This is done by removing the clamping nuts and the keepers on one end of the bolts and withdrawing the latter so that one set of sleeves may be withdrawn and another one of the desired width mounted thereon. In making such change the movable side plate of the mold is of course withdrawn the necessary distance and again advanced against the strip securing sleeves after the strip is in position, so as to position the side plates in close relation to said strip. The bolt clamping nuts are then cinched up to retain the strip at the desired radius. This latter operation however is done after the casing is in position, the strip being brought into proper contact with the casing by raising the strip at its relatively free end; the operator being able to feel such contact as it occurs to complete the true radius.

Heat for vulcanizing purposes is applied by electric heating devices. One such device is provided for the exterior of the tire and another one for the interior. The device 20 for the interior is in the form of a liner disposed between the casing 19 and the air pressure bag 21. This device is preferably of the same general character as disclosed in the copending application for patent of Walter R. J. Woock, Serial No. 500,800 filed December 8, 1930, only shorter, or of a size like that shown in my copending application for Patent, Serial No. 431,287, filed February 25, 1930.

The outer heating device is in the form of a shoe 22 molded in the main of soft pliable rubber in which the heating element is embedded near its outer surface. In a longitudinal plane the shoe is formed with a normal curvature which is a mean between the extremes of curvature between the strip 18, or approximately twenty-one inches. In cross-section the shoe is flat across the bottom and up the sides so as to fit snugly between the plates 4 and rest flatly on the strip 18. The upper surface of the shoe, besides having the longitudinal curvature, has a concave curvature corresponding to that of the exterior of a tire; said curvature tapering to feather edges at their junction with the sides.

Layers 24 of cork or other heat insulating material are embedded in the shoe below the heating element, so as to keep the heat away from the strip 18. By reason of the shape of the shoe and the material of which it is constructed, the same shoe may be used for all settings of the strip 18, since it is capable of flexing and stretching in a longitudinal plane so as to conform to the curvature of the strip 18. If a strip of different width is used a different heating shoe is used also, having a width conforming to that of said other strip. A single inner heating liner however may be used for all tires, regardless of their size.

The tire when being thus repaired and vulcanized is mounted on a rim 25 as usual, and to hold the tire against possible shifting while in the mold a clamping device is applied against the bottom of the rim from above and substantially radially of the same.

I have provided a device for the purpose which is adjustable for any diameter of casing or spacing between the side plates, and which is also shiftable lengthwise of the mold as the vertical center line of the casing shifts with the shifting and setting of the supporting strip 18. This device comprises a yoke bar 26 extending transversely of the mold above the same and having a depending screw 27 turnable therein intermediate its ends. The lower end of this screw preferably carries a flexibly mounted shoe 28 to engage the rim 25 and having a bottom curvature slightly less than that of the smallest rim encountered. On one end the yoke is pivoted on a bracket 29 which is adapted to straddle and slidably engage the outwardly projecting top flange 30 of the adjacent side plate of the mold, and to be releasably clamped thereto by a screw 31.

The pivot pin 32 of this bracket is placeable through any one of a row of holes 33 arranged in the yoke lengthwise of the same or transversely of the mold.

At its opposite end the yoke is provided with a flat shoe 34 resting on the top of the corresponding mold plate. A C-clamp 35 is swivelly connected to this foot by a pin 36 which removably engages any one of a horizontal row of holes 37 in said foot. The bottom of this clamp when swung down is adapted to engage the under side of a longitudinal outwardly projecting top flange 38 on the adjacent side plate of the mold and to be releasably clamped thereto by a screw 39. By reason of this structure the clamping yoke may be swung to one side of the mold when a tire is being placed in or removed from the same, it may be slid along to properly position the screw radially of the tire regardless of the size of the latter; and the structure may be adjusted so that it can be used and properly supported from the mold sides regardless of the spacing of the latter. It may also be easily withdrawn as a single unit from association with the mold if desired or necessary.

From the foregoing description it will be readily seen that I have produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A tire repair mold comprising rigid transversely spaced side plates, a segmental flexible tire supporting strip disposed therebetween and curved from end to end, and means connecting said strip to the plates to alter the straight line distance between the ends of the strip, whereby to correspondingly alter the radius of curvature of the strip.

2. A tire repair mold comprising rigid transversely spaced side plates, a segmental flexible tire supporting strip disposed therebetween and curved from end to end, and means connecting said strip to the plates to alter the radius of curvature of strip to any selected extent between predetermined limits.

3. A tire repair mold comprising rigid transversely side plates, an element disposed between and supported in connection with the plates, said element being flat transversely and curved longitudinally to conform to the exterior circumferential curvature of a tire, and a heating device removably supported on said element; said device having a longitudinal curvature corresponding to that of the element and in cross section being shaped on its bottom and sides to flatly engage the element and side plates and its upper surface having a concave curvature to follow the transverse exterior curvature of a tire.

4. A structure as in claim 1, with a heating device supported on said strip; the upper surface of said device being formed with a longitudinal transverse concave curvature to fit about a section of a tire, said device including a body of flexible and elastic material whereby it may be made to conform to and follow the curvature of the strip with any adjusted position of the latter.

5. A tire repair mold comprising rigid transversely spaced side plates, a flexible tire supporting strip disposed therebetween and curved from end to end, means connecting said strip to the plates in a manner to enable the straight line distance between the ends of the strip to be altered, whereby to cause the radius of curvature of the strip to be correspondingly altered, a clamping screw adapted to extend substantially radially of a supported tire, and means detachably supporting said screw from the side plates for movement lengthwise of the same.

6. A tire repair mold comprising rigid transversely spaced side plates, a flexible tire supporting strip disposed therebetween and curved from end to end, means connecting said strip to the plates in a manner to enable the straight line distance between the ends of the strip to be altered, whereby to cause the radius of curvature of the strip to be correspondingly altered, a clamping screw adapted to extend substantially radially of a supported tire, and means detachably supporting said screw from the side plates for movement lengthwise of the same, and for independent transverse upward swinging movement to one side of the mold.

7. A tire repair mold comprising rigid transversely spaced side plates, a flexible tire supporting strip disposed therebetween and curved from end to end, a fixed anchor for one end of the strip, and a member to which the other end of the strip is secured arranged for movement vertically of the mold in a plane diverging downwardly relative to the vertical plane of the anchor, whereby the straight line distance between the ends of the strip is increased as said other end is lowered, and vice versa.

8. A tire repair mold comprising rigid transversely spaced side plates, a flexible tire supporting strip disposed therebetween and curved from end to end, a fixed anchor for one end of the strip, a member to which the other end of the strip is secured projecting transversely of the mold and slidable through slots provided in the side plates, and clamping means applied to said member to hold the same at any position along the slots; said slots being arranged relative to the anchor so that the straight line distance between the ends of the strip will be constantly altered with the movement of said member from one end to the other of the slots.

9. A tire repair mold comprising rigid transversely spaced side plates, a flexible tire supporting strip disposed therebetween and curved from end to end, a fixed anchor for one end of the strip, a member to which the other end of the strip is secured arranged for movement in a direction such as to cause the straight-line distance between the ends of the strip to be altered with such movement, and means for releasably clamping the member at any desired point between its limits of movement.

10. A tire repair mold comprising rigid transversely spaced side plates, a flexible tire supporting strip disposed therebetween and curved from end to end, a fixed anchor for one end of the strip, a member to which the other end of the strip is secured arranged for movement in a direction such as to cause the straight-line distance between the ends of the strip to be altered with such movement, and so that an increase in such distance is accompanied by an increase in distance between the strip and the top of the mold, and clamping means applied to said member to hold the same in any desired set position.

In testimony whereof I affix my signature.

WALTER R. J. WOOCK.